Dec. 4, 1934.　　　F. E. WOLCOTT　　　1,983,211
ELECTRIC STOVE
Filed Jan. 15, 1932　　2 Sheets-Sheet 1

INVENTOR
FRANK E. WOLCOTT
BY
ATTORNEY.

Dec. 4, 1934.  F. E. WOLCOTT  1,983,211
ELECTRIC STOVE
Filed Jan. 15, 1932   2 Sheets-Sheet 2

INVENTOR
FRANK E. WOLCOTT
BY
ATTORNEY.

Patented Dec. 4, 1934

1,983,211

UNITED STATES PATENT OFFICE 1,983,211

ELECTRIC STOVE

Frank E. Wolcott, West Hartford, Conn., assignor to The Silex Company, a corporation of Connecticut Application January 15, 1932, Serial No. 586,810

35 Claims. (Cl. 219—43)

My invention relates to electric stoves.

It has for its object to provide an improved electric stove, and more particularly, an improved electric stove especially adapted to use in connection with glass vacuum type coffee makers or the like. A further object of my invention is to provide such a stove having improved circulating and distributing means adapted to deliver a maximum amount of heat to the object to be heated while minimizing the heating of the heater support. A still further object of my invention is to provide an improved stove comprising improved elements constructed and connected in an improved manner and carrying improved bowl supporting means while also being provided with improved air circulating means. Another object of my invention is to provide an improved structure whereby at the same time that the above objects are realized, an improved and simplified construction is produced which may be very readily and economically manufactured, and also assembled or disassembled whenever desired, as, for example, when changing the heating element. These and other objects and advantages of my improved construction will, however, hereinafter more fully appear.

In the accompanying drawings, I have shown for purposes of illustration, one form which my invention may assume in practice.

In these drawings,—

Figure 1:
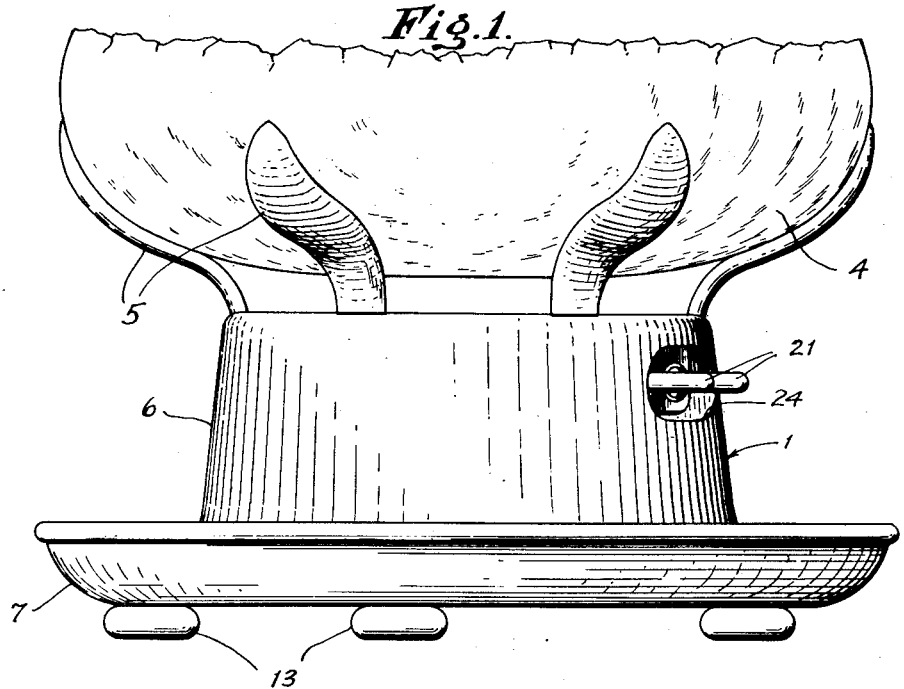
Figure 1 is a side elevation of this form of my improved stove used in connection with a coffee maker bowl.
Figure 3:
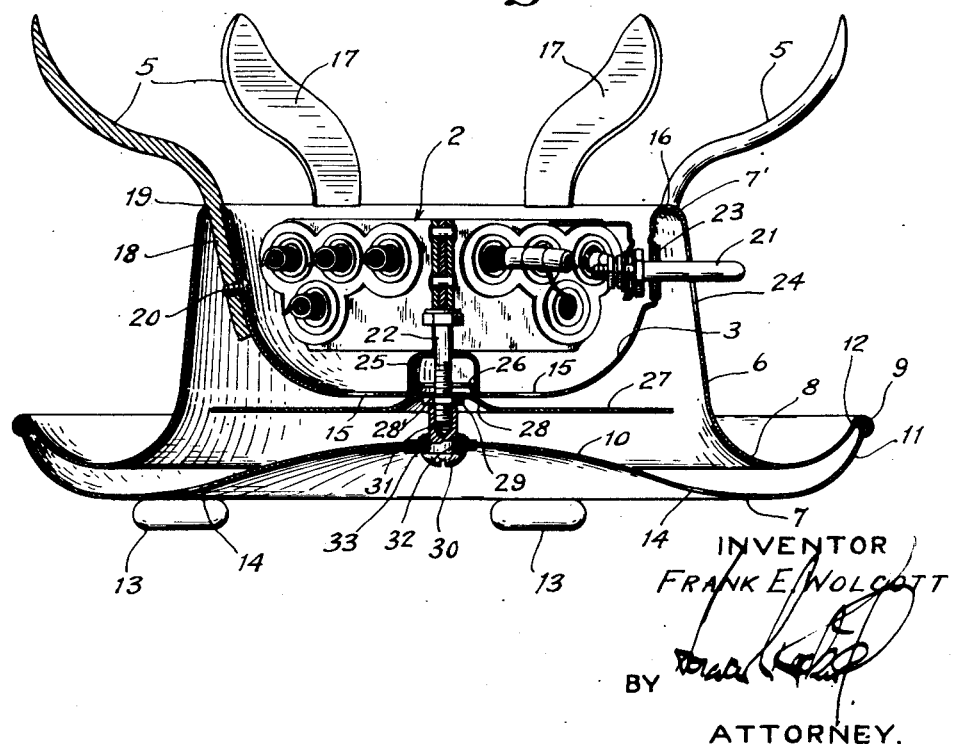
Fig. 3 is a vertical sectional view on line 3—3 of Figure 2.
Figure 2:
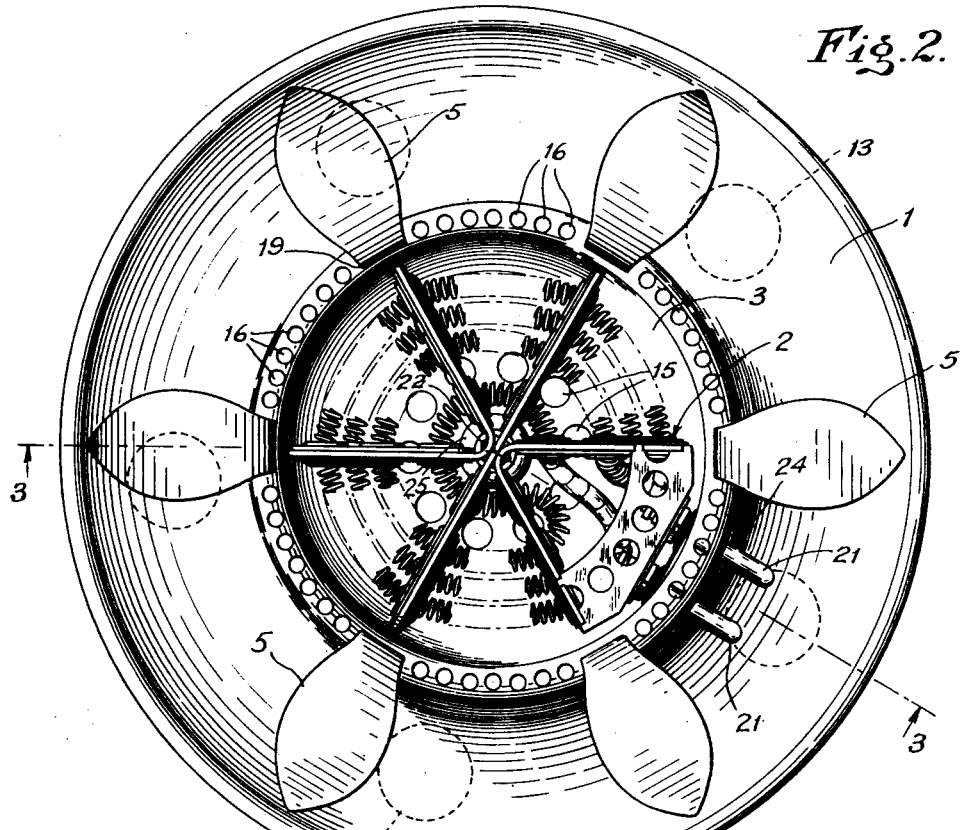
Fig. 2 is a plan view of the stove with the bowl removed.
Figure 4:
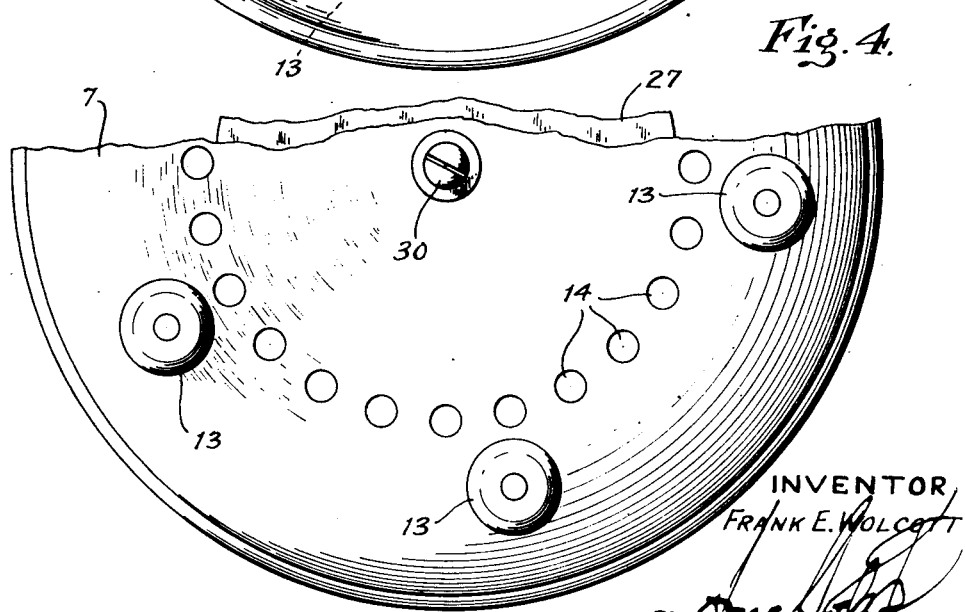
Fig. 4 is a partial bottom plan view of the stove.

In this illustrative construction, I have shown a stove comprising a base, generally indicated at 1, and having a suitable heating unit, generally indicated at 2, disposed within a reflecting bowl 3 inside the base and adapted to supply heat to an article to be heated, herein a coffee maker bowl 4, supported on a series of radially disposed supports 5, all as hereinafter more specifically described.

Referring more particularly to the base 1, it will be noted that the same herein, as preferably, comprises two casing members 6 and 7. Of these, the member 6 has an axial depression forming the reflector bowl 3, a rounded portion 7' forming a rim on the upper edge of the bowl 3, and depending sides, indicated at 6, extending below the bottom of the bowl 3 and having an upturned flange portion 8 on the bottom thereof below the bottom of the bowl 3, while an overturned rim 9 is provided around the edge of the flange portion 8. Co-operating with this member 6 is the member 7 which provides a supporting means or base plate therefor. As shown, this member 7 is provided with an axial raised portion 10 in its axis extending from adjacent the flange portions 8 on the member 6 up toward the reflector bowl 3, but preferably spaced therefrom vertically by a substantial distance to provide an air space, as illustrated. Around this portion 10, the member 7 is herein also spaced substantially below the flange 8 on the member 6 to provide an air space as shown. Also, it will be observed that the member 7 is provided with an upturned flange 11 on its periphery terminating in a portion 12 which is received within the downturned lip 9 on the member 6 and has its upper edge engageable with the inside surface of that lip, while the bent over edge of the lip also engages the outside of the portion 11 slightly below the edge 12 thereon. In a preferred construction as shown, the member 7 also carries a plurality of insulating feet 13. Thus it will be noted that while the base proper comprises the two members 6 and 7, a construction is provided in which, due to the air space between the portions 3 and 8 of the member 6 relative to the member 7 and the supporting of the member 6 only upon the edge 12 of the member 7, the member 6 is adapted to be effectually insulated from the member 7, while the reflector bowl 3, due to its spacing from the outer walls of the member 6, is also adapted to be effectually insulated from those walls of the latter member.

Attention is here also directed to the improved air circulating means provided in the new base comprising the members 6 and 7. More particularly it will be noted that the base plate member 7 is provided with a series of openings 14 permitting air circulation therethrough. Herein these openings are disposed around its axis and just inside the supporting feet 13. While the number and arrangement of these apertures 14 may be varied, it will be noted that herein the same are of substantial size and that a substantial number of the same is provided in such manner as to permit a free circulation of air around the raised portion 10 of the member 7. Moreover, it will be noted that the bowl 3 on the member 6 is provided with a series of smaller apertures 15 in its bottom surrounding the axis of this reflector bowl, while a series of apertures 16 is also provided in the rounded rim 7' of the portion 6 surrounding the bowl 3 and between each adjacent pair of supports 5. Thus it will be evident that air passage means are provided in the members 6 and 7 which will permit a free circulation of air up through the heating unit 2 and up around the outside of the reflector bowl 3 and between the same and the outer sides of the member 6 in such manner as to insure not only an effective supply of heated air to the article supported on the supports 5, but that the temperatures of the members 6 and 7 will not be permitted to rise unduly.

The members 5, which support the bowl to be heated, are herein also of an improved construction and connected to and supported by the base in an improved manner. Herein it will be noted that the members 5, which are radially disposed, have wide curved portions 17 engageable with the bottom and sides of the bowl 4. These wide portions 17 provide a stable support for the bowl, and are further so connected to the base as to supply a very considerable amount of heat by conduction directly to the bowl. Herein, it will be noted that the members 5 are provided below their bowl engaging portions 17 with depending portions 18, of smaller cross section than the portions 17, but still quite wide, which pass through corresponding apertures 19 in the rim portion 7' on the member 6 between the different sets of apertures 16 heretofore described. While these portions 18 may be of varying length and arranged and connected in other ways, herein it will be noted that, as preferably, they terminate above the bottom of the reflector bowl and are passed down along the outside wall of the reflector bowl 3 while being spaced from the outer wall of the member 6, and are also connected to the bowl 3 by screws 20. Thus it will be noted that a construction is provided which enables the conduction of a substantial amount of heat from the reflector bowl 3 to the bowl to be heated, and accordingly increases the effectiveness of the device while reducing the heat which would otherwise remain in the base.

While heating units of various form may be supported in the reflector bowl 3, the unit 2 used herein is preferably of the removable spider type construction described and claimed in my co-pending application, Serial No. 586,811, filed January 15, 1932, and provided with terminals 21 carried thereby and adapted to be connected with any suitable current supply, while also having an axial connecting means 22 for connecting the unit in the desired position in the reflector bowl 3. Herein, however, it will be noted that the terminals 21 which are carried by the unit 2 not only extend through suitable insulated eyelets 23 in the walls of the reflector bowl 3, but also extend through an enlarged aperture 24 in the outside wall of the member 6. It will be noted that the axial connecting means 22 is herein not only provided with a depending cup member 25 which receives and is centered by a raised axially apertured portion 26 on the bottom of the bowl 3, but that this axial connection is herein utilized as a connecting means for an improved baffle disposed between the reflector bowl 3 and the member 7 and also as an improved connecting means for the members 6 and 7.

Referring first to the improved baffle means, it will be noted that I herein provide a circular baffle plate 27 herein disposed slightly below the bottom of the reflector bowl and spaced by a greater distance from the raised portion 10 on the member 7. Herein, this baffle member has an imperforate body and is spaced around its periphery from the inside wall of the member 6 in such manner as to provide a passage between the openings 14 in the member 7 and the openings 15 and 16 in the member 6. Herein, it will also be noted that the member 27 is provided with an axially located and apertured slightly raised portion 28 of generally conical shape, which has its upper end received in the raised portion 26 on the reflector bowl 3 and also has an axial aperture 28' therein adapted to permit the lower threaded end of the member 22 to extend therethrough. Thus, a nut 29 below the portion 28 will hold the member 27 in position on the member 22 and the baffle member 27 is enabled to perform its new baffling function while being positioned on the axial connection between the heating unit 2 and the reflector bowl 3.

As regards the connections for the members 6 and 7, it will be evident that the construction thus far described also provides an exceedingly convenient means of connecting the member 7 to the member 6. Herein, this is accomplished by extending the threaded portion of the member 22 below the nut 29 and providing a screw 30 having an axial threaded recess 31 therein adapted to be threaded upon the threaded extremity of the member 22 and also adapted to hold the member 10 in position, while being insulated from the latter. As shown, a suitable axial aperture 32 is provided in the raised portion 10 on the member 7 and a suitably insulated bushing 33 is seated in this aperture, so that when the screw 30 is inserted through the bushing and screwed on to the lower end of the member 22, the member 7 is effectually connected to the member 6. Obviously, the tightening of the screw 30 will also force the rim 12 on the member 7 into engagement with the down turned rim portion 9 on the member 6, and, since all the rest of the parts are connected to the member 6, provide a unitary construction when assembled, and one which is also capable of being very readily and quickly assembled or disassembled when desired, since all of the parts are connected to a single axial connecting member 22.

In the operation of my improved construction, it will be evident that when the heating unit 2 is supplied with current, the heat generated thereby will be supplied to the bottom of the bowl 4 as described in my co-pending application, mentioned above, some of the heat passing directly to the bowl, while the reflector bowl also acts to reflect certain of the heat rays on to the bowl. In addition, it will be noted that herein heat will be supplied to the bowl 4 in a substantial amount by conduction through the supports 5, due not only to the improved construction and connections of the latter to the reflector bowl, but to the enclosing of these connections. Attention is also directed to the fact that, through my improved circulating means, it is made possible to maintain an effective circulation through the coils of the unit 2. Moreover, while enclosing the reflector bowl in the casing 6, it is also made possible to keep down the temperature of the base, the flow of air provided in the members 6 and 7 and through the openings 14, around the baffle 27, and to and through the openings 15 and 16, being such as, while delivering the heated air on to the bowl 4, to keep the exterior of the member 7 quite cool and also keep the member 6 from being discolored. Attention is also directed to the fact that due to the support of the member 6 on the rim 12 of the member 7 and the spacing of the portion 8 on the member 6 from the member 7, the amount of heat which can be transmitted to the base plate 7 is materially reduced thereby as well as by the baffle.

As a result of my improved construction, it is made possible to continue to obtain automatic quick cooling and automatic limitation of infusion upon the completion of a normal infusion period and effectively using heating units of substantial heating capacity, while effectually insulating the latter in such manner as to enable the stove to be handled conveniently and comfortably and also eliminating marring of table surfaces supporting the same and eliminating discoloration of the stove casing.

Attention is also directed to the fact that the construction is such as to be very economically produced, the members 6, 7 and 27 being capable of being stamped and thus produced very economically. The members 5 are also of such form as to enable the same to be cast and thus economically produced. Attention is also directed to the fact that this construction is such as not only to enclose the parts in an effective manner and thus cut down the wastage of heat, but that the same is also such as to enable a device of exceedingly simple and attractive lines to be produced, with a minimum of connections visible and while providing surfaces which lend themselves readily to ornamentation in various forms. These and other advantages of my improved construction will, however, be apparent to those skilled in the art.

While I have in this application specifically described one form which my invention may assume in practice, it will be understood that this form of the same is shown for illustrative purposes and that this illustrative embodiment may be modified and embodied in various other forms without departing from its spirit or the scope of the appended claims.

What I claim as new and desire to secure by Letters Patent is:

1. An electric stove comprising a cupped casing member, a heating element in the top thereof, bowl supporting means above said member having free lateral communication with the atmosphere between an article on said means and said heating element, and a cooperating casing member forming the bottom of said member and having its bottom spaced from the bottom of said cupped member.

2. An electric stove comprising a cupped casing member having a depending outer flange, a heating element in the cup thereof, upstanding peripheral bowl supporting means above said member providing a bowl seat adjacent said heating element and having lateral communication with the atmosphere below an article on said seat, and a co-operating casing member supporting said flange and forming the bottom of said member and having its bottom spaced from the bottom of said cupped member.

3. An electric stove comprising an inverted cupped casing member having a bowl in the top thereof, a heating element in said bowl, distributed over the top thereof, article supporting means above said member having free lateral communication with the atmosphere between an article on said means and said heating element, and a cooperating casing member forming the bottom of said member and having its bottom spaced from the bottom of said cupped member and from the bottom of said bowl.

4. An electric stove comprising a cupped casing member having a depending outer flange, a heating element distributed over the top of the cup in said member, a co-operating casing member supporting said flange and forming the bottom of said cupped casing member and having its bottom spaced from the bottom thereof, and co-operating means between the bottom member and said heating element for further insulating said bottom member from said heating element.

5. An electric stove comprising an inverted cupped casing member having a bowl in the top thereof, a heating element distributed over the top of said bowl, a co-operating casing member forming the bottom of said member and having its bottom spaced from the bottom of said cupped member and the bottom of said bowl, and baffle means between the bottom of said bowl and the bottom of said bottom member.

6. An electric stove comprising an inverted cupped casing member having a bowl in the top thereof, a heating element distributed over the top of said bowl, a co-operating casing member forming the bottom of said member and having its bottom spaced from the bottom of said cupped member and the bottom of said bowl, and air circulating means leading through said bottom member and upward through said bowl and heating element.

7. An electric stove having an enclosing casing comprising a base member and an inverted cupped casing member thereon having a bowl in the top thereof, a heating element in said bowl, and means for providing a heating or cooling air flow up through said base member and bowl and around said heating element.

8. An electric stove having an enclosing casing comprising a base member and an inverted cupped casing member thereon having a bowl in the top thereof, a heating element in said bowl, and means for providing a heating or cooling air flow up through said base member, around the exterior of said bowl, and up through said bowl and heating element.

9. An electric stove having an enclosing casing comprising a base member and an inverted cupped casing member thereon having a bowl in the top thereof, a heating element in said bowl, and means for providing a heating or cooling air flow up through said bowl and around the exterior of the latter and through said heating element comprising passage means in the top of said cupped member and through said bowl, and cooperating passage means in said base member and through said heating element.

10. In an electric stove, a casing comprising co-operating base and casing members and having closed sides and an inner bowl disposed in the top member and spaced from the bottom of the other member, a heating element in said bowl, baffle means in said casing between the bottom of said bowl and the bottom of said other member, and air passage means leading up through said base, around said baffle means, and upward through said bowl.

11. In an electric stove, a casing comprising co-operating base and casing members and having an inner bowl disposed in the top member and spaced from the bottom of the other member, a heating element in said bowl, baffle means in said casing between the bottom of said bowl and the bottom of said other member, and air circulating means in said casing above and below said baffle means leading upward through said base around said baffle and both upward outside said bowl and upward through said bowl and the heating element therein.

12. In an electric stove, a base having a bowl, a heating unit therein, upstanding supporting fingers for the article to be heated carried by said bowl providing an article seat closely adjacent yet spaced above said bowl and said unit and having lower ends extending below the top of said bowl, and enclosing means for said bowl and said lower ends.

13. In an electric stove, a bowl, a heating unit therein, upstanding supporting fingers for the article to be heated carried by said bowl providing an article seat closely adjacent yet spaced above said bowl and said unit and having lower ends carried on the exterior of said bowl, and enclosing means for said bowl and said lower ends having a passage spacing said enclosing means from said ends.

14. In an electric stove, a base having a bowl, a heating unit therein, upstanding means for supporting the article to be heated providing an article seat closely adjacent yet spaced above said bowl and having lateral communication with the atmosphere between said seat and bowl, and enclosing means for said bowl having a passage between the same and said bowl and outlet means around the top of said bowl delivering toward an article on said supporting means.

15. In an electric stove, a base having a bowl, a heating unit therein, radially disposed upstanding bowl supporting members on the top of said bowl, carried thereby and providing an article seat closely adjacent yet spaced above said bowl and unit and enclosing means for said bowl having a passage between the same and said bowl and outlet means around the top of said bowl between said members.

16. In an electric stove, a bowl, means for supporting the same, heating means in said bowl, and a series of radially disposed supports independent of said supporting means and carried by said bowl and projecting above said bowl from the periphery of the latter.

17. In an electric stove, a bowl, means for supporting the same, heating means in said bowl, and a series of radially disposed upstanding supports independent of said supporting means and carried by and projecting above said bowl from the periphery of the latter, said supports having wide upper ends forming an article support above and adjacent said bowl periphery.

18. In an electric stove, a bowl, means for supporting the same, heating means in said bowl and a series of radially disposed supports independent of said supporting means carried by said bowl and projecting upward from the rim of said bowl and having elongated upper article engaging ends and short lower ends fastened to the exterior of said bowl.

19. In an electric stove, a bowl, means for supporting and enclosing the same, heating means in said bowl, and a series of radially disposed supports independent of said supporting means having upper ends projecting above said bowl and lower ends carried by and connected to said bowl and enclosed in said enclosing means.

20. In an electric stove, a reflector bowl, means for supporting and enclosing the same, and a series of radially disposed supports independent of said means having upper ends projecting above said bowl and lower ends carried by and connected to said bowl and enclosed in said supporting means, said supports having wide upper ends and lower ends of substantial section for conducting heat from said bowl to the article to be heated.

21. In an electric stove, a base comprising a top member provided with a heating unit aperture in its top and a lower base flange, and a base plate supporting said top member and engaging the same only at the periphery of said flange, a heating unit in said aperture, and means for connecting said base members and unit together.

22. In an electric stove, a base comprising a top member provided with an upper reflector bowl in its top and a lower base flange, and a base plate supporting said top member engaging the same only at the periphery of said flange, a heating unit in said reflector bowl, and axially disposed means for connecting the base members and unit together.

23. In an electric stove, a base comprising a top member provided with an upper reflector bowl in its top and a lower base flange, a base plate supporting said top member and engaging the same only at the periphery of said flange, a heating unit in said reflector bowl, baffle means disposed between said reflector bowl and base plate inside the base, and means for connecting the parts together.

24. In an electric stove, a base plate having an upturned peripheral flange presenting an upstanding edge, a co-operating casing member having a base flange spaced above said flange and having a depending rim portion supported only on said edge, a heating unit carried by said co-operating casing member, and means for connecting the parts together.

25. In an electric stove, a base member having a reflector bowl, a heating unit therein, a base plate spaced below said reflector bowl, centrally disposed means for connecting said unit and reflector bowl together comprising a depending member carried by said unit and extending through said bowl, and means for connecting said base plate to said depending member.

26. In an electric stove, a base member having a reflector bowl, a heating unit therein, a base plate spaced below said reflector bowl, a baffle means spaced between said base plate and said reflector bowl, axially located means for connecting said unit and reflector bowl together comprising a depending member carried by said unit and extending through said bowl, and means for connecting said base plate and said baffle means to said depending member.

27. In an electric stove, a casing member having a depression in its top forming a bowl, depending outer sides spaced from said bowl, a base plate, supporting means for the article to be heated carried on the rim of said bowl above the same and communicating laterally with the atmosphere below an article on said means, a heating element in said bowl and adjacent an article on said supporting means, and air circulating means through said casing member and base plate having apertures in said base plate and in said bowl and a series of apertures surrounding the top of said bowl and air passage means through said heating element.

28. An electric stove having a bowl in the top thereof, a heating unit having a resistance element distributed over the top of said bowl and having in said bowl a quick cooling resistance element support and air passage means through said support, means providing an article support above and closely adjacent said heating unit having free lateral communication with the atmosphere between said unit and an article on said article support, a supporting and enclosing casing for said bowl spaced from the bottom and sides thereof, and air passage means leading through the bottom and top of said casing and through the bottom and along the outside of said bowl.

29. In an electric stove, a casing member having a depression in its top forming a reflector bowl, depending outer sides spaced from said bowl, and a peripheral base flange, a base plate engageable only with said base flange, supports for the article to be heated above said reflector bowl and having their lower ends between the latter and said sides of said casing member, a heating element in said reflector bowl, and circulating means through said casing member and base plate comprising apertures in said base plate and in said reflector bowl.

30. In an electric stove, a casing member having a depression in its top forming a reflector bowl, depending outer sides spaced from said bowl, and a peripheral base flange, a base plate engageable only with said base flange, supports for the article to be heated above said reflector bowl and having their lower ends between the latter and said sides of said casing member, a heating element in said reflector bowl, and circulating means through said casing member and base plate having apertures in said base plate and in said reflector bowl and a series of apertures surrounding the top of said reflector bowl.

31. In an electric stove, a casing member having a depression in its top forming a reflector bowl, depending outer sides spaced from said bowl, and a peripheral base flange, a base plate engageable only with said base flange, supports for the article to be heated above said reflector bowl and having their lower ends between the latter and said sides of said casing member, a heating element in said reflector bowl, circulating means through said casing member and base plate having apertures in said base plate and in said reflector bowl and a series of apertures surrounding the top of said reflector bowl, and baffle means between the bottom of said reflector bowl and said base plate.

32. In an electric stove, a casing member having a depression in its top forming a reflector bowl, depending outer sides spaced from said bowl, and a peripheral base flange, a base plate engageable only with said base flange, supports for the article to be heated above said reflector bowl and having their lower ends between the latter and said sides of said casing member, a heating element in said reflector bowl, circulating means through said casing member and base plate having apertures in said base plate and in said reflector bowl and a series of apertures surrounding the top of said reflector bowl, baffle means between the bottom of said reflector bowl and said base plate, and axial connecting means for said unit, casing member, and base plate.

33. In a coffee maker stove, a casing having a bottom, a heater housing bowl in said casing having its bottom spaced above said casing bottom, an electric heating element in said bowl, coffee bowl supporting means providing a seat spaced above said casing and providing free communication laterally with the atmosphere beneath said seat and above said heating element while a coffee bowl is on said supporting means, and means for effecting a flow of air up through said casing bottom and branching flows up around the exterior of said first mentioned bowl and up through said bowl.

34. In an electric stove, a casing member having a bottom, a bowl in the top of said casing member and having a bottom spaced from the bottom of the latter, a heating element in said bowl, coffee bowl supporting means spaced above said heating element and having free lateral communication with the atmosphere between said heating element and a coffee bowl on said supporting means, baffle means spaced below the bottom of said element and above the bottom of said casing cooperating with the bottom of said bowl in preventing overheating, and cooperating means for providing a circulation of air through said casing bottom and both up inside and up along the exterior of said first mentioned bowl during current flow and upon cessation of current flow.

35. In a coffee maker stove, a casing having a bottom, a heater housing bowl in said casing having its bottom spaced above said casing bottom, an electric heating element in said bowl, coffee bowl supporting means providing a seat spaced above said casing and providing free communication laterally with the atmosphere beneath said seat and above said heating element while a coffee bowl is on said supporting means, and means for effecting a flow of air up through said casing bottom and branching flows up around the exterior of said first mentioned bowl and up through said bowl, said baffle means being disposed coaxially with the bottom of said first mentioned bowl and vertically spaced therefrom and cooperating therewith to provide a plurality of superimposed baffling means between said element and the casing bottom.

FRANK E. WOLCOTT.